United States Patent
Segawa et al.

(10) Patent No.: US 11,534,875 B2
(45) Date of Patent: Dec. 27, 2022

(54) SEALING FIN FIXING APPARATUS AND SEALING FIN FIXING METHOD

(71) Applicant: Mitsubishi Heavy Industries, Ltd., Tokyo (JP)

(72) Inventors: Kiyoshi Segawa, Yokohama (JP); Yuta Yanase, Tokyo (JP); Takeshi Izumi, Yokohama (JP); Shoichi Saito, Yokohama (JP); Takashi Yoshida, Yokohama (JP); Shin Tachibana, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 17/349,542

(22) Filed: Jun. 16, 2021

(65) Prior Publication Data
US 2021/0394318 A1 Dec. 23, 2021

(30) Foreign Application Priority Data

Jun. 17, 2020 (JP) .............................. JP2020-104359

(51) Int. Cl.
*B23P 19/08* (2006.01)
*B23P 19/04* (2006.01)
(Continued)

(52) U.S. Cl.
CPC ........... *B23P 19/084* (2013.01); *B23P 19/047* (2013.01); *F01D 5/005* (2013.01);
(Continued)

(58) Field of Classification Search
CPC .................. B23P 19/084; B23P 19/047; Y10T 29/49872; Y10T 29/53657;
(Continued)

(56) References Cited

U.S. PATENT DOCUMENTS 4,715,110 A * 12/1987 St. Angelo ............ B23P 19/047
29/235
5,127,143 A * 7/1992 Urlacher ............. B25B 27/0092
29/235
(Continued)

FOREIGN PATENT DOCUMENTS

JP 54-75467 A 6/1979
JP 60-141401 A 7/1985
(Continued)

OTHER PUBLICATIONS

Hindi-language Office Action issued in Indian Application No. 202114025908 dated Feb. 24, 2022 with English translation (six (6) pages).
(Continued)

*Primary Examiner* — Jermie E Cozart
(74) *Attorney, Agent, or Firm* — Crowell & Moring LLP

(57) ABSTRACT

A sealing fin fixing apparatus can fix a sealing fin to a rotor in a shortened period of time to minimize variations of the pullout strength of the sealing fin. In the sealing fin fixing apparatus that fixes the sealing fin in a sealing groove defined in the outer circumference of the rotor of a rotary machine and includes a headstock for setting a rotor thereon, a Z-stage movable along a Z-axis, an X-stage movable along an X-axis, a tool rest supported on the X-stage, and a caulking tool mounted on the tool rest and including a shank and a pressing roller, while the pressing roller is being held against a caulking wire inserted, together with the sealing (Continued)

fin, in the sealing groove in the rotor that is set on the headstock, the headstock is actuated to rotate the rotor, thereby caulking the caulking wire to fix the sealing fin to the rotor.

4 Claims, 4 Drawing Sheets

(51) Int. Cl.
  *F01D 5/00* (2006.01)
  *F01D 11/00* (2006.01)
(52) U.S. Cl.
  CPC ......... *B23P 2700/11* (2013.01); *F01D 11/003* (2013.01); *Y10T 29/49872* (2015.01); *Y10T 29/5112* (2015.01); *Y10T 29/5114* (2015.01); *Y10T 29/5198* (2015.01); *Y10T 29/53657* (2015.01); *Y10T 29/53687* (2015.01)
(58) Field of Classification Search
  CPC ........... Y10T 29/53687; Y10T 29/5112; Y10T 29/5114; Y10T 29/5198; F01D 5/005; F01D 11/003
  See application file for complete search history.

(56) References Cited

U.S. PATENT DOCUMENTS

| | | |
|---|---|---|
| 8,864,443 B2 | 10/2014 | Narita et al. |
| 2006/0185166 A1 | 8/2006 | Adis et al. |

FOREIGN PATENT DOCUMENTS

| | | |
|---|---|---|
| JP | 2006-233971 A | 9/2006 |
| JP | 2010-43565 A | 2/2010 |
| JP | 2012-35328 A | 2/2012 |

OTHER PUBLICATIONS

Japanese-language Office Action issued in Japanese Application No. 2020-104359 dated Sep. 20, 2022 with English translation (11 pages).

* cited by examiner

SEALING FIN FIXING APPARATUS AND SEALING FIN FIXING METHOD

BACKGROUND OF THE INVENTION

1. Field of the Invention

The present invention relates to a sealing fin fixing apparatus and a sealing fin fixing method of fixing a sealing fin to a rotor in a rotary machine.

2. Description of the Related Art

Rotary machines represented by steam turbines and gas turbines include a sealing fin disposed in a clearance defined between the outer circumferential surface of a rotor and the inner circumferential surface of a stator for preventing a working fluid such as steam, gas, or the like from leaking through the clearance for thereby achieving increased performance. The sealing fin is mounted on either the rotor or the stationary body or on both the rotor and the stator. When a sealing fin that is mounted on the rotor is worn on its tip end by contact with the stator, the clearance between the stator and the sealing fin increases, lowering the sealing performance of the sealing fin and increasing the leakage of the working fluid. It is necessary to restore the clearance between the stator and the sealing fin in order to recover the reduced sealing performance.

Sealing fins on the rotor are roughly classified into machined sealing fins and caulked sealing fins. A machined sealing fin is formed by cutting off an outer circumferential portion of a rotor blank, and is inseparable from a rotor. When the machined sealing fin is worn, since the machined sealing fin is integral with the rotor, it is difficult to recover the worn portion of the machined sealing fin, and it is extremely costly to replace the rotor in its entirety because of the wear of the machined sealing fin. The stator may be replaced with another stator having a smaller inside diameter to make up for the wear to the tip end of the machined sealing fin. However, the replacing process is not practical from the standpoints of the sealing performance and the period required to replace the stator as well as the cost of the process.

On the other hand, a caulked sealing fin is separate from a rotor and fixedly fitted in a sealing groove defined circumferentially in the outer circumferential surface of the rotor. The caulked sealing fin has an inner circumferential end portion inserted in the fin groove and caulked and securely fixed to the rotor by a caulking wire. Even if the tip end of the caulked sealing fin is damaged by contact with the stator, the caulked sealing fin can be replaced with a new one. It is not necessary to machine the rotor in replacing the caulked sealing fin, and the sealing performance is renewed to the level of the new caulked sealing fin. Furthermore, as the sealing width of a single caulked sealing fin can be reduced, a plurality of caulked sealing fins can be mounted in an axially packed array on the rotor. In addition, it is known in the art that the caulked sealing fin undergoes small axial vibrations upon contact with the stator when the rotary machine starts up and shuts off. Therefore, the clearance between the caulked sealing fin and the stator can be reduced for better sealing performance.

However, when a sealing fin is manually secured to a rotor by caulking with a chisel or an air hammer, it takes time to install the sealing fin on the rotor. It is not rare for some steam turbines to have more than one hundred caulked sealing fins disposed between a shaft end and a vane depending on the number of casings and vane arrays. Therefore, a large amount of time and labor is required to install sealing fins manually in steam turbines.

Various ideas have been proposed to perform caulking processes efficiently using caulking wires. For example, JP-2006-233971-A discloses a sealing assembly that uses a peening tool. JP-2010-43565-A reveals a caulking device that travels on the outer circumferential surface of a rotor.

PRIOR ART DOCUMENT

Patent Documents

[Patent Document 1] JP-2006-233971-A
[Patent Document 2] JP-2010-43565-A

According to the sealing assembly disclosed in JP-2006-233971-A, since a peening device hits a caulking wire against a rotor while the rotor is rotating about its central axis, the spots where the caulking wire is impacted by the peening device are circumferentially spaced around the rotor. Consequently, the distance by which the caulking wire is pressed into a sealing groove in the rotor, i.e., the radial distance between the surface of the rotor and the surface of the caulking wire, hereinafter referred to as "press-fit distance," tends to have circumferentially periodic variations. Inasmuch as the pullout strength of sealing fins is closely related to the press-fit distance, the variations in the press-fit distance are likely to cause variations in the pullout strength of sealing fins.

If the variations in the pullout strength of sealing fins are large, then when the rotor undergoes intensive centrifugal forces while the rotary machine is in operation, the sealing fins may possibly start pulling out of their sealing grooves from spots where the pullout strength is lower. Moreover, increasing the rotational speed of the rotor for the purpose of shortening the period of time required to install the sealing fins results in a reduction in the pullout strength of the sealing fins because the locations where the caulking wire is hammered by the peening device are spaced apart more widely. Furthermore, when the pullout strength has periodic variations, when the press-fit distance of the caulking wire is inspected at a plurality of circumferentially spaced locations on the caulking wire, the spots where the pullout strength is lower may possibly be overlooked.

In addition, when the sealing assembly disclosed in JP-2006-233971-A is to be used, construction work has to be done on a large scale to install the sealing assembly on a foundation. Furthermore, various actuators including an actuator for driving the peening device needs to be controlled in synchronism with the rotor as it rotates. For hitting the caulking wire that has a small width of about few millimeters with the peening device, it is necessary to position the sealing assembly with respect to the rotor such that the peening device hits the caulking wire along a trajectory exactly along the caulking wire, a task that is difficult to achieve and time-consuming.

The caulking device disclosed in JP-2010-43565-A also tends to cause variations in the pullout strength of a caulking wire as it uses a peening device as is the case with the sealing assembly disclosed in JP-2006-233971-A. Moreover, the caulking device disclosed in JP-2010-43565-A is set on the outer circumferential surface of a rotor and is movable on its own on the outer circumferential surface of the rotor as it is held at rest. Vibrations caused by the peening device as it operates are likely to adversely affect a trajectory along which the peening device hits the caulking wire, tending to make the trajectory unstable or possibly bringing the trajectory out of alignment with the caulking wire in extreme instances.

It is therefore an object of the present invention to provide a sealing fin fixing apparatus and a sealing fin fixing method of fixing a sealing fin to a rotor in a shortened period of time to minimize variations of the pullout strength of the sealing fin.

SUMMARY OF THE INVENTION

To achieve the above object, there is provided, according to the present invention, a sealing fin fixing apparatus for fixing a sealing fin in a sealing groove defined in an outer circumference of a rotor of a rotary machine, including: a headstock for setting a rotor thereon; a Z-stage movable along a Z-axis extending parallel to a rotational shaft of the headstock; an X-stage supported on the Z-stage and movable along an X-axis in a direction perpendicular to the Z-axis; a tool rest supported on the X-stage; and a caulking tool mounted on the tool rest, in which the caulking tool includes a shank mounted on the tool rest and a pressing roller rotatably supported on the shank, the pressing roller having a rotational shaft mounted on the tool rest in a posture parallel to the rotational shaft of the headstock, and while the pressing roller is being held against a caulking wire inserted, together with the sealing fin, in the sealing groove in the rotor that is set on the headstock, the headstock is actuated to rotate the rotor, thereby caulking the caulking wire to fix the sealing fin to the rotor.

According to the present invention, it is possible to fix the sealing fin to the rotor in a shortened period of time to minimize variations of the pullout strength of the sealing fin.

DESCRIPTION OF THE PREFERRED EMBODIMENTS

Preferred embodiments of the present invention will hereinafter be described below with reference to the drawings.

First Embodiment

—Sealing Fin Fixing Apparatus—

Figure 1:
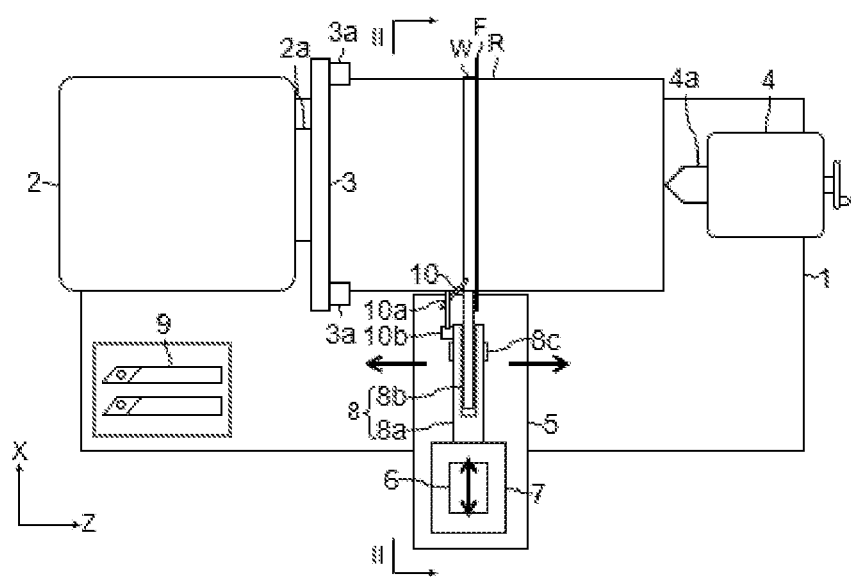
FIG. 1 is a front elevational view schematically illustrating a sealing fin fixing apparatus according to a first embodiment of the present invention.
Figure 2:
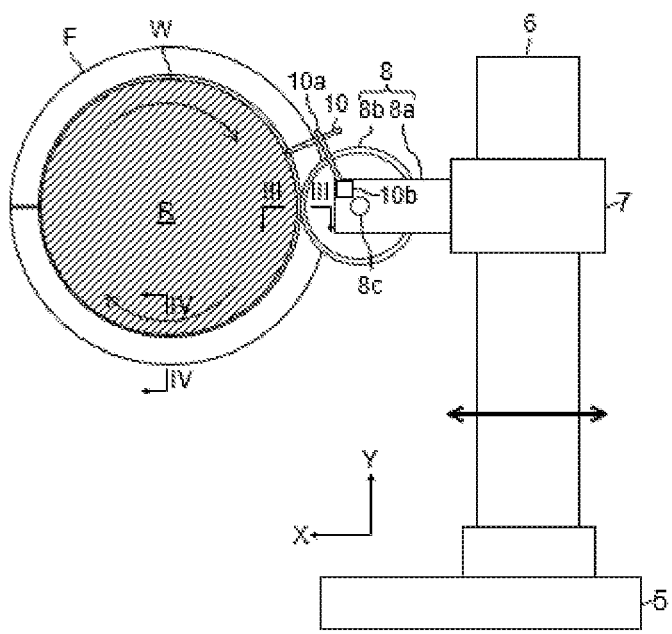
FIG. 2 is a cross-sectional view taken along line II-II of FIG. 1.
Figure 3:
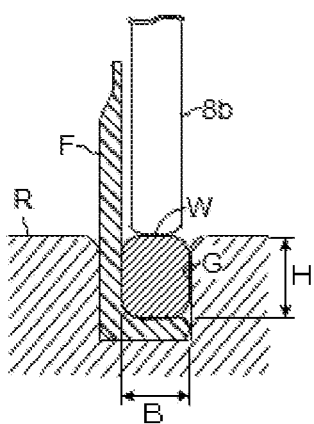
FIG. 3 is a cross-sectional view taken along line III-III of FIG. 2.
Figure 4:
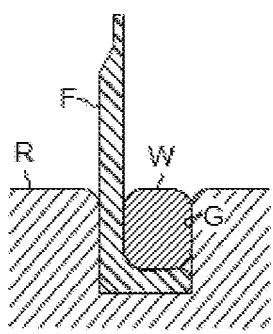
FIG. 4 is a cross-sectional view taken along line IV-IV of FIG. 2.

FIG. 1 is a front elevational view schematically illustrating a sealing fin fixing apparatus according to a first embodiment of the present invention. FIG. 2 is a cross-sectional view taken along line II-II of FIG. 1. FIG. 3 is a cross-sectional view taken along line III-III of FIG. 2. FIG. 4 is a cross-sectional view taken along line IV-IV of FIG. 2. FIG. 1 illustrates the sealing fin fixing apparatus as viewed in a radial direction of a cylindrical rotor R, and FIG. 2 illustrates the sealing fin fixing apparatus as viewed in an axial direction of the rotor R. In FIG. 2, a bed 1, to be described later, is omitted from illustration. With respect to the sealing fin fixing apparatus, there is defined an XYZ coordinate system as illustrated in FIGS. 1 and 2 that has a Z-axis extending parallel to the rotational shaft of a headstock 2, to be described later, i.e., in leftward and rightward directions in FIG. 1, an X-axis extending perpendicularly to the Z-axis, i.e., in upward and downward directions in FIG. 1, and a Y-axis extending perpendicularly to the Z-axis and the X-axis, i.e., in upward and downward directions in FIG. 2. Directions along the X-axis, Y-axis, and Z-axis will be referred to as X-axis, Y-axis, and Z-axis directions.

The sealing fin fixing apparatus illustrated in FIGS. 1 through 4 is a device for fixing a sealing fin F in a sealing groove G defined in the outer circumferential surface of the rotor R that is included in a rotary machine represented by a steam turbine or a gas turbine. Though the sealing fin fixing apparatus can be newly designed and fabricated as a dedicated apparatus for fixing the sealing fin F to the rotor R, it can also be fabricated on the basis of other apparatus for use in different applications, e.g., a lathe having a function to hold and rotate the rotor R about its central axis and a function to move a tool toward and away from the rotor R.

The sealing fin F is normally divided into a plurality of parts that are separate in the circumferential directions of the rotor R. The separate parts are arrayed into a ring shape circumferentially around the rotor R. The sealing fin F is mounted on the rotor R by a caulking wire W, as described later. The caulking wire W has a length commensurate with the circumferential length of the sealing groove G. When the caulking wire W as a single wire is fitted into the sealing groove G, the caulking wire W extends as a single loop fully around the rotor R. However, the caulking wire W may be divided into a plurality of wire segments that are separate in the circumferential directions of the rotor R and the wire segments may be arrayed into a single loop circumferentially around the rotor R. As illustrated in FIGS. 3 and 4, the sealing fin F has an L-shaped cross-sectional shape including a radially inner bent base portion. The bent base portion of the sealing fin F is inserted or embedded in the sealing groove G, and pressed and fixed to the rotor R by the caulking wire W that is subsequently press-fit in the sealing groove G.

Before being press-fit in the sealing groove G, the caulking wire W has a width B equal to or slightly smaller than the width of the sealing groove G as modified by the sealing fin F inserted therein, i.e., the dimension calculated by subtracting the thickness of the sealing fin F from the width of the sealing groove G itself. When the caulking wire W is press-fit into the sealing groove G in which the sealing fin F has been inserted, the caulking wire W is caulked or deformed, firmly securing the sealing fin F to the rotor R. The sealing fin fixing apparatus according to the present embodiment is used to press-fit the caulking wire W into the sealing groove G. The sealing fin fixing apparatus according to the present embodiment is made up of components including the bed 1, the headstock 2, a tailstock 4, a Z-stage 5, an X-stage 6 (see also FIG. 2), a tool rest 7, a caulking tool 8, a cutting tool 9, and a measuring instrument 10. These components will successively be described below.

—Bed—

The bed 1 acts as a foundation of the sealing fin fixing apparatus and includes rails, not shown, along which the Z-stage 5 and the tailstock 4 are movable parallel to the Z-axis directions.

—Headstock—

The headstock 2 is a unit on which the rotor R is set for rotation about its central axis. The headstock 2 is fixedly mounted and hence supported on an end of the bed 1 in a Z-axis direction, i.e., a left end of the bed 1 in the present embodiment. The headstock 2 includes an actuator, not shown, housed therein, a spindle 2a rotatable about its central axis by the actuator, and a faceplate 3 mounted on the distal end of the spindle 2a that projects from the headstock 2. The actuator comprises an electric motor, for example. The actuator has an output shaft, not shown, coupled to the spindle 2a directly or through a drive power transmitting mechanism, not shown, such as a speed changing mechanism.

The rotor R is set on the faceplate 3. The faceplate 3 is of a disk-shaped part that holds the rotor R thereon in setting the rotor R on the headstock 2. The rotor R is thus mounted on the distal end of the spindle 3 through the faceplate 3 for rotation in unison with the spindle 2a. The faceplate 3 has a plurality of chucks 3a for holding the rotor R in the same posture as the spindle 2a, i.e., in axial alignment with the spindle 2a. The chucks 3a act as a vice including three or more claws movable radially on the faceplate 3 toward and away from the center of the faceplate 3, i.e., the central axis of the spindle 2a. The rotor R has an axial end gripped by the claws and held on the faceplate 3.

—Tailstock—

The tailstock 4 presses, with a tail spindle 4a, the center of rotation of the other axial end of the rotor R set on the headstock 2 toward the headstock 2, thus the tailstock 4 and the headstock 2 support the rotor R therebetween. The tailstock 4 is supported on the bed 1 on the other end of the bed 1 and is slidable on the bed 1 in the Z-axis directions toward and away from the headstock 2. The tailstock 4 is positionally adjustable in the Z-axis directions and can be secured in position in the Z-axis directions.

—Z-Stage—

The Z-stage 5 is supported on the bed 1 and can be translated along the Z-axis with respect to the bed 1 while being guided by the rails, not shown. If the sealing fin fixing apparatus is fabricated on the basis of a lathe, then a component referred to as "carriage" normally provided on the lathe can be used as the Z-stage 5. The Z-stage 5 is movable with respect to the bed 1 by the axial force produced by a screw, for example. The Z-stage 5 is moved in the Z-axis directions by a Z-axis feed drive mechanism of the sealing fin fixing apparatus for adjusting the position, in the Z-axis directions, of the caulking tool 8 with respect to the rotor R set on the spindle 2a. The present invention is not limited to any particular drive mechanism for the Z-stage 5.

—X-Stage—

The X-stage 6, see also FIG. 2, is supported on the Z-stage 5 and can be translated along the X-axis with respect to the Z-stage 5 while being guided by rails, not shown, thereon. If the sealing fin fixing apparatus is fabricated on the basis of a lathe, then a component referred to as "cross slide" normally provided on the lathe can be used as the X-stage 6. The X-stage 6 is movable with respect to the Z-stage 5 by the axial force produced by a screw, for example. The X-stage 6 is moved in the X-axis directions by an X-axis feed drive mechanism of the sealing fin fixing apparatus for adjusting the position, in the X-axis directions, of the caulking tool 8 with respect to the rotor R set on the spindle 2a. The present invention is not limited to any particular drive mechanism for the X-stage 6.

—Tool Rest—

The tool rest 7 is supported on the X-stage 6. If the sealing fin fixing apparatus is fabricated on the basis of a lathe, then a component referred to as "tool holder" normally provided on the lathe can be used as the tool rest 7. The tool rest 7 is not displaceable with respect to the X-stage 6. A plank can be used to adjust the position, in the Y-axis directions, of the caulking tool 8 with respect to the rotor R. For example, the plank is placed beneath the shank of the cutting tool 9 or the caulking tool 8 to bring the height of the cutting tool 9 or the caulking tool 8 into alignment with the central axis of the rotor R with respect to the Y-axis directions. However, if the sealing fin fixing apparatus is newly designed and fabricated not on the basis of a lathe, then it may incorporate a mechanism for moving the tool rest 7 in the Y-axis directions with respect to the X-stage 6.

—Caulking Tool—

The caulking tool 8 is a tool used to caulk the sealing fin F in the sealing groove G defined in the outer circumference of the rotor R, and is mounted on the tool rest 7. The caulking tool 8 includes a shank 8a and a pressing roller 8b. The shank 8a is a base portion of the caulking tool 8, and is mounted on the tool rest 7, supporting the caulking tool 8 on the tool rest 7. The pressing roller 8b is a roller for rolling along the caulking wire W to press the caulking wire W and the sealing fin F into the sealing groove G. The pressing roller 8b is rotatably supported on the shank 8a. As illustrated in FIG. 3, the pressing roller 8b has a width slightly smaller than the width B of the caulking wire W. The caulking tool 8 does not include an actuator for driving the pressing roller 8b. The caulking tool 8 is mounted on the tool rest 7 in such a posture that the pressing roller 8b has a rotational shaft 8c extending parallel to the central axis of the rotational shaft, i.e., the spindle 2a, of the headstock 2.

For using the caulking tool 8, the drive mechanisms are operated to adjust the positions of the Z-stage 5 and the X-stage 6 to press the pressing roller 8b against the caulking wire W inserted, together with the sealing fin F, in the sealing groove G in the rotor R that has been set on the headstock 2. Then, the X-stage 6 is actuated to press the caulking wire W into the sealing groove G by a predetermined distance. Then, the headstock 2 is actuated to rotate the spindle 2a and hence the rotor R. The caulking wire W is now press-fit in the sealing groove G by the pressing roller 8b, and is caulked to fix the sealing fin F to the rotor R.

The caulking tool 8 may exclusively be mounted on the tool rest 7. According to the present embodiment, however, the caulking tool 8 is available as one of a plurality of attachments that can be mounted on the tool rest 7. Stated otherwise, another attachment such as the cutting tool 9 may be mounted on the tool rest 7 in place of the caulking tool 8.

—Cutting Tool—

The cutting tool 9 is another one of the attachments that can be mounted on the tool rest 7, and can be mounted on the tool rest 7 in place of the caulking tool 8. The sealing fin fixing apparatus with the cutting tool 9 mounted on the tool rest 7 is able to finish the outer profile of the rotor R while turning the rotor R, form the sealing groove G in the rotor R, or cut the outer circumferential portion of the sealing fin F to adjust the outer diameter of the sealing fin F to a predetermined value. When the sealing fin fixing apparatus does not need a function to cut the rotor R while turning the rotor R, the sealing fin fixing apparatus is not required to have the cutting tool 9 as an attachment.

—Measuring Instrument—

The measuring instrument 10 is an instrument for measuring the outer diameter of the caulking wire W or the sealing fin F, and may be dial gage, for example. The measuring instrument 10 is attached to a universal arm 10a having multiple-axis degrees of freedom. The universal arm 10a is attached to a holder 10b. The holder 10b includes a magnetic holder, for example, and is magnetically secured to the shank 8a of the caulking tool 8 or the tool rest 7, for example. The measuring instrument 10 is therefore secured to the caulking tool 8 or the tool rest 7. For using the measuring instrument 10, the universal arm 10a is adjusted to bring the tip end of the measuring instrument 10 into contact with the caulking wire W or the sealing fin F. When the rotor R is then rotated by the spindle 2a, the measuring instrument 10 measures changes in the distance from the central axis of the rotor R to the surface of the caulking wire W or the sealing fin F at different circumferential positions, thereby measuring the outer profile of the caulking wire W or the sealing fin F. Using the measuring instrument 10, it is possible to inspect the circumferential uniformity of the press-fit state of the sealing fin F, i.e., the pullout strength of the sealing fin F, and the uniformity of the outer diameter of the sealing fin F. In addition, it is possible for the measuring instrument 10 to inspect the outer diameter of the rotor R, or specifically the outer circumferential surface of the rotor R except for the sealing groove G and adjacent to the sealing groove G, the depth of the sealing groove G, and the like. By determining the difference between the outer diameter of the caulking wire W and the outer diameter of the rotor R, it is possible to grasp the amount by which the caulking wire W is caulked from the surface of the rotor R, i.e., the depth of the caulking wire W from the surface of the rotor R, that is closely related to the pullout strength. When the sealing fin fixing apparatus does not need such an inspecting function, the sealing fin fixing apparatus is not required to have the measuring instrument 10.

—Sealing Fin Fixing Method—

A sealing fin fixing method according to the present embodiment for fixing the sealing fin F in the sealing groove G defined in the outer circumferential surface of the rotor R includes a rotor setting step, a rotor finishing step, a sealing groove machining step, a caulking tool installing step, a caulking step, and an inspecting step. The sealing fin fixing method that fixes the sealing fin F to the rotor R using an existing lathe will be described below. However, the sealing fin F can be fixed to the rotor R in essentially the same way using the sealing fin fixing apparatus illustrated in FIGS. 1 and 2. The rotor setting step, the rotor finishing step, the sealing groove machining step, the caulking tool installing step, the caulking step, and the inspecting step will successively be described below.

—Rotor Setting Step—

The rotor setting step is a step of setting the rotor R on the headstock of the lathe. Specifically, the operator operates a plurality of chucks to grip the outer circumference of an axial end of the rotor R and secure the rotor R to a faceplate mounted on the spindle of the headstock. The process of gripping the rotor R with the chucks doubles as a centering process for bringing the spindle in axial alignment with the central axis of the rotor R. If necessary, the headstock is actuated to support the other axial end of the rotor R.

—Rotor Finishing Step—

The rotor finishing step finishes the outer profile of the rotor R. The rotor finishing step is carried out after the rotor setting step and before the sealing groove machining step, for example. In other words, when the rotor finishing step is included in the sealing fin fixing method, the rotor R fixed to the headstock in the rotor setting step is a rotor blank to be finished in the rotor finishing step. In the rotor finishing step, the operator installs a cutting tool on the cutter holder and actuates the headstock to cause the cutting tool to cut the outer circumferential surface of the rotor blank, thereby finishing the outer profile, i.e., mainly the outer circumferential surface, of the rotor R. The cutting tool may be the cutting tool 9 illustrated in FIG. 1. After the rotor finishing step, the sealing groove machining step can take over without dislodging the finished rotor R from the headstock. When the outer profile of the rotor R has already been finished by another machine tool, the rotor finishing step may be omitted.

—Sealing Groove Machining Step—

In the sealing groove machining step, the operator installs a cutting tool on the cutter holder and actuates the headstock to cause the cutting tool to cut into the outer circumference of the rotor R, thereby forming the sealing groove G therein. The cutting tool may be the cutting tool 9 illustrated in FIG. 1. The sealing groove machining step is carried out after the rotor setting step and before the caulking tool mounting step. After the sealing groove machining step, the operator replaces the cutting tool to be mounted on the cutter holder with a caulking tool, and the caulking tool mounting step takes over without dislodging the rotor R from the headstock. When the sealing groove G has already been formed in the rotor R by another machine tool, the sealing groove machining step may be omitted.

—Caulking Tool Installing Step—

In the caulking tool installing step, the operator installs a caulking tool, i.e., the shank of a caulking tool, on the cutter holder of the lathe in such a posture that the central axis of the pressing roller lies parallel to the central axis of the rotor R, i.e., the central axis of the spindle of the headstock. The caulking tool may be the caulking tool 8 illustrated in FIGS. 1 and 2. When at least either the rotor finishing step or the sealing groove machining step is included in the sealing fin fixing method, the caulking tool installing step is carried out after the rotor setting step, the rotor finishing step, and the sealing groove machining step. When neither the rotor finishing step nor the sealing groove machining step is included in the sealing fin fixing method, the caulking tool mounting step may be carried out before, after, or simultaneously with the rotor setting step. By fabricating the caulking tool 8 and mounting the caulking tool 8 on the cutter holder of the lathe in the posture referred to above, the lathe is converted into the sealing fin fixing apparatus.

—Caulking Step—

In the caulking step, a pressing roller is pressed against the caulking wire W inserted, together with the sealing fin F, into the sealing groove G defined in the rotor R set on the headstock, and then the headstock is actuated to rotate the rotor R, caulking the caulking wire W to fix the sealing fin F to the rotor R.

In the caulking step, the sealing fin F is temporarily secured in the sealing groove G before the caulking wire W is caulked by the caulking tool 8. Specifically, the sealing fin F is inserted into the sealing grove G in the rotor R until the bent base portion of the sealing fin F is housed in the sealing groove G, and then the caulking wire W is placed at the opening of the sealing groove G. Then, a tool such as a chisel, an air hammer, or the like is used to manually hit the caulking wire W lightly radially inwardly toward the central axis of the rotor R, deforming the caulking wire W into the sealing groove G. The bent base portion of the sealing fin F that is housed in the sealing groove G is retained in place by the caulking wire W. The portion of the chisel or air hammer that is used to hit the caulking wire W to secure the sealing fin F temporarily has a curved round surface that is slightly projecting in circumferential directions. The rotor R is intermittently rotated to move successive portions of the caulking wire W along the sealing groove G through a spot where the caulking wire W is to be hit by the tool, and the operator manually operates the tool to hit those successive portions of the caulking wire W at the spot, thereby temporarily securing the sealing fin F and the caulking wire W in the sealing groove G all circumferentially along the rotor R.

After the caulking wire W has been temporarily secured in the sealing groove G, the operator adjusts the positions of the carriage and cross slide of the lathe to hold the outer circumferential surface of the pressing roller 8*b* of the caulking tool 8 against the outer circumferential surface of the caulking wire W. At this time, the pressing roller 8*b* is held in contact with the caulking wire W such that a plane including the centers of rotation of the rotor R and the pressing roller 8*b* extends along the trajectory that the cutter holder is moved to follow in the X-axis directions by the cross slide. Specifically, on the premise that the cutter holder moves horizontally in directions perpendicular to the central axis of the rotor R, the height of the caulking tool 8 is adjusted, using a plank if necessary, to bring the central axis of the rotor R and the central axis of the pressing roller 8*b* into alignment with each other. Thereafter, the cutter holder is moved toward the central axis of the rotor R, pressing the caulking wire W a predetermined distance, e.g., a fraction of the height H of the caulking wire W, into the sealing groove G under the axial force by which the cutter holder is moved. Then, the headstock is actuated to rotate the rotor R about its central axis through one revolution. It is desirable that the rotational circumferential speed of the headstock be constant regardless of the diameter of the rotor R. In this case, it is necessary to set the rotational speed of the rotor R to a value calculated from the diameter and rotational circumferential speed of the rotor R according to the equation: rotational speed (rpm)=rotational circumferential speed (rpm)/(3.14× rotor diameter (m)). Alternatively, the rotational speed of the rotor R may be set to a value that is individually determined depending on the diameter of the rotor R, the pressing force required to caulk the caulking wire W, and the like. When the rotor R has made one revolution, the cutter holder is moved again to bring the caulking tool 8 a predetermined distance closer to the central axis of the rotor R, and the rotor R is rotated through one revolution. The procedure is repeated a plurality of times to press the caulking wire W into the sealing groove G by a predetermined distance each time. In this manner, as illustrated in FIG. 3, the caulking wire W is press-fit into the sealing groove G until the outer circumferential surface of the caulking wire W has moved a certain distance toward the central axis of the rotor R with respect to the outer circumferential surface of the rotor R, i.e., the outer circumferential surface of the rotor R except for the sealing groove G and across the sealing groove G. Now, the caulking step is completed. The sealing fin F is thus securely fixed to the rotor R.

If there are a plurality of sealing fins F to be fixed to the rotor R, then the sealing fins F are temporarily secured in respective sealing grooves G in the rotor R, and thereafter a plurality of caulking wires W are successively press-fit and caulked in the sealing grooves G to fix the sealing fins F to the rotor R. Alternatively, a sealing fin F may be temporarily secured in a corresponding sealing groove G and then press-fit and caulked in the sealing groove G to fix the sealing fin F to the rotor R, and then a next sealing fin F may be temporarily secured in a corresponding sealing groove G and then press-fit and caulked in the sealing groove G to fix the sealing fin F to the rotor R. The process is repeated until all sealing fins F are fixed to the rotor R.

It has been described that the sealing fin F is temporarily secured in the sealing groove G before the caulking wire W is press-fit in the sealing groove G. However, the temporary securing process may be omitted. For example, instead of inserting the sealing fin F into the sealing groove G, applying the caulking wire W, and hitting the caulking wire W with a chisel or the like, the caulking wire W is held in place by the pressing roller 8*b*. Then, the cutter holder is moved toward the central axis of the rotor R to push the caulking wire W into the sealing groove G by the force from the cutter holder, and the rotor R is rotated to caulk the caulking wire W. Thereafter, the procedure described above is continued until the caulking step is completed. This is a temporary securing process using the caulking tool 8.

—Inspecting Step—

In the inspecting step, a measuring instrument is attached to either the caulking tool or the cutter holder and measures the outer diameter of the rotor R, the caulking wire W, or the sealing fin F. The measuring instrument may be the measuring instrument 10 illustrated in FIGS. 1 and 2. The outer diameter is measured in the manner described above. Specifically, the operator holds the tip end of the measuring instrument 10 against the outer circumferential surface of the rotor R, the caulking wire W, or the sealing fin F, and rotates the rotor R slowly while seeing the graduations of the measuring instrument 10. The operator can thus confirm whether the outer diameter is of a desired value or not and whether the outer diameter has irregularities or not. Generally, since it is necessary to adjust the outer diameter of the sealing fin F to a predetermined design value, the outer diameter of the sealing fin F can be adjusted by attaching the cutting tool 9 to the cutter holder and cutting the sealing fin F while turning the sealing fin F. In this case, the outer diameter of the sealing fin F is measured after having adjusted the tip end of the sealing fin F.

The inspecting step can be carried out without removing the rotor from the headstock before or after the caulking step. Specifically, the inspecting step can be carried out after the rotor finishing step to confirm whether the outer diameter of the rotor R has been finished to design, or the inspecting step can be carried out after the sealing groove machining step to confirm whether the sealing groove G has been formed to design. Furthermore, the inspecting step can be carried out after the caulking step to confirm whether the caulking wire W has been press-fit to design fully circumferentially. When the caulking wire W is repeatedly press-fit a plurality of times, i.e., when the cutter holder is repeatedly moved and the rotor R is repeatedly rotated, in the caulking step, the inspecting step can be carried out appropriately if necessary during the caulking step to confirm the press-fit state of the caulking wire W.

—Advantages—

(1) The sealing fin fixing apparatus described above includes the headstock 2 for rotating the rotor R set thereon about its central axis and the caulking tool 8 that is positionally adjustable in the X-, Y-, and Z-axis directions. Using the sealing fin fixing apparatus, the rotor R is set on the headstock 2, and the headstock 2 is actuated in one of the X-axis directions while the pressing roller 8*b* is being held against the caulking wire W inserted, together with the sealing fin F, in the sealing groove G. The rotor R is then rotated with respect to the caulking tool 8 that stays rigidly in the same position, caulking the caulking wire W to fix the sealing fin F to the rotor R.

The process of caulking the caulking wire W that would otherwise be generally performed manually using a chisel or the like is efficiently carried out by the sealing fin fixing apparatus to shorten the period of time required to fix the sealing fin F to the rotor R. The sealing fin fixing apparatus has the merit of reducing the operator dependency, i.e., variations in the caulked state of the caulking wire W depending on the operator's skill. Moreover, while the caulking wire W is being caulked, the positional relation between the caulking tool 8 and the rotor R remains unchanged, and constant forces are applied circumferentially continuously to the caulking wire W in a manner different from caulking the caking wire W by hitting it. The pullout strength of the sealing fin R is thus prevented from varying. Therefore, both a reduction in the cost of the sealing fin fixing process and an increase in the reliability of the sealing fin fixing process are achieved.

(2) Since the sealing fin fixing apparatus described above allows the cutting tool 9 in place of the caulking tool 8 to be mounted on the tool rest 7, the sealing fin fixing apparatus is able to perform not only the caulking step of caulking the caulking wire W but also the sealing groove machining step and the rotor finishing step. Simply by changing tools, further, it is possible to switch between the caulking step of caulking the caulking wire W and the sealing groove machining step and the rotor finishing step with the rotor R remaining set on the headstock 2. A process of moving the rotor R, a retooling process, and a centering process are not required, resulting in high working efficiency. In addition, when the outer profile of the rotor R and the sealing groove G are cut, the rotor R and the sealing groove G are necessarily centered by the cutting processes, thus the pullout strength can be uniformized highly accurately in the caulking step of caulking the caulking wire W.

(3) As the sealing fin fixing apparatus further includes the measuring instrument 10, the sealing fin fixing apparatus is capable of measuring the outer diameter of the rotor R, the caulking wire W, or the sealing F, i.e., performing the inspecting step. Since the central axis of the rotor R remains unchanged in the inspecting step, the sealing fin fixing apparatus is able to secure high inspecting efficiency.

(4) Moreover, according to the sealing fin fixing method described above, the caulking step of caulking the caulking wire W can be performed using an existing lathe. In an environment where a right-size lathe is available, therefore, the caulking step of caulking the caulking wire W can be performed using the caulking tool 8 if only the caulking tool 8 is at hand.

(5) According to the sealing fin fixing method described above, furthermore, the intrinsic function of a lathe to be used in the caulking step of caulking the caulking wire W can be carried out to cut the rotor R as a workpiece while turning it to machine the sealing groove G in the rotor R and finish the outer profile of the rotor R. The same lathe can be used to perform these steps to achieve large merits in terms of working efficiency and accuracy as described above. It is also advantageous in that the inspecting step can be carried out using the measuring instrument.

(6) Providing the rotational circumferential speed of the headstock in the caulking step is constant regardless of the diameter of the rotor R, the rotational speed of the rotor R can be determined by simple calculations as described above, and the operator dependency is also expected to be reduced.

(7) A plurality of repetitions of the procedure of rotating the rotor R through one revolution while the caulking tool 8 is being held against the caulking wire W in the caulking step can contribute to uniformization of the pullout strength of the sealing fin F.

Second Embodiment

Figure 5:
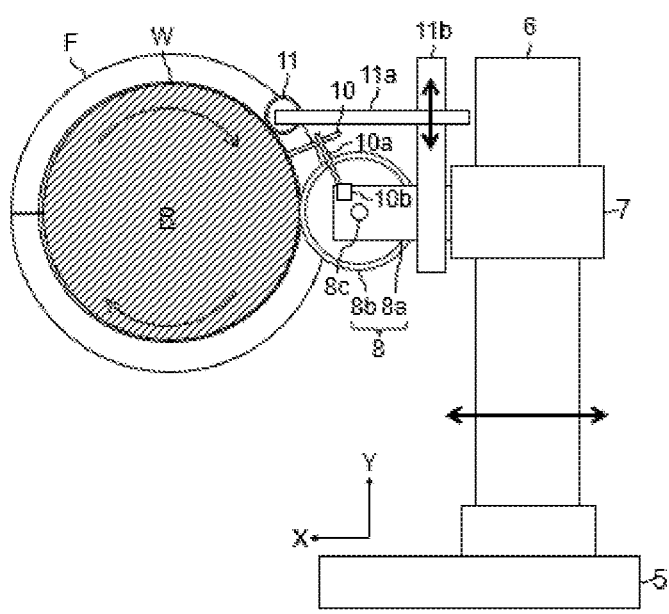
FIG. 5 is a side elevational view schematically illustrating a sealing fin fixing apparatus according to a second embodiment of the present invention.

FIG. 5 is a side elevational view schematically illustrating a sealing fin fixing apparatus according to a second embodiment of the present invention, the view corresponding to FIG. 2 according to the first embodiment. In FIG. 5, those components that are identical or correspond to those described in the first embodiment are denoted by identical reference characters illustrated in the former figures and will be omitted from description. The second embodiment is different from the first embodiment in that the sealing fin fixing apparatus according to the second embodiment includes a holding roller 11 that contacts the caulking wire W before the pressing roller 8b contacts the caulking wire W.

For convenience of explanation, an upstream side and a downstream side are defined with respect to the direction, used as a reference, of movement of the caulking wire W relative to the pressing roller 8b that is caulking the caulking wire W. Specifically, when the rotor R is rotated clockwise as illustrated in FIG. 5 to caulk the caulking wire W, an upper side of the pressing roller 8b is on the upstream side whereas a lower side of the pressing roller 8b is on the downstream side. When the rotor R is rotated in the opposite direction while the pressing roller 8b is caulking the caulking wire W, the lower side of the pressing roller 8b is on the upstream side whereas the upper side of the pressing roller 8b is on the downstream side.

According to the present embodiment, a post 11b is attached to the shank 8a of the caulking tool 8. The post 11b extends upstream of the shank 8a along the Y axis. According to the present embodiment, it is premised in the caulking step that the rotor R is rotated clockwise in FIG. 5, and the post 11b extends upstream of the shank 8a along the Y axis on the premise.

The holding roller 11 is rotatably supported on a support 11a. The support 11a is an arm-shaped member extending along the X-axis, and is supported on the post 11b attached to the shank 8a of the caulking tool 8 so as to be positionally adjustable, i.e., vertically movable along the Y-axis. The support 11a can be fixed in position by a stopper mechanism, not shown, after being positionally adjusted along the Y-axis with respect to the post 11b. The post 11b extends upwardly along the Y-axis from the shank 8a, i.e., upstream of the pressing roller 8b. Therefore, in the caulking step, the holding roller 11 contacts the caulking wire W before the pressing roller 8b contacts the caulking wire W. The post 11b may be integrally fixed to the shank 8a or may be detachably fixed to the shank 8a.

The holding roller 11 is a roller for rolling on the caulking wire W and holding and introducing the caulking wire W into the sealing groove G, and is rotatably supported on the support 11a. The holding roller 11 has a width that is about the same as the width of the pressing roller 8b. The holding roller 11 has a diameter not limited to any particular value, but smaller than the diameter of the pressing roller 8b according to the present embodiment. The sealing fin fixing apparatus according to the second embodiment does not include an actuator for driving the holding roller 11, as is the case with the pressing roller 8b. The holding roller 11 has a rotational shaft extending parallel to the rotational shaft 8c of the pressing roller 8b. Furthermore, the shortest distance between the outer circumferential surface of the holding roller 11 and the central axis of the rotor R is the same as or longer than the shortest distance between the outer circumferential surface of the pressing roller 8b and the central axis of the rotor R by a predetermined distance, e.g., a distance equal to or smaller than the height H of the caulking wire W before it is deformed.

The holding roller 11 may be resiliently supported on the support 11a to allow the distance between the outer circumferential surface of the holding roller 11 and the central axis of the rotor R to vary resiliently.

The other structural details of the sealing fin fixing apparatus according to the present embodiment are similar to those of the sealing fin fixing apparatus according to the first embodiment described with reference to FIGS. 1 through 4.

According to the present embodiment, the action of the holding roller 11 substitutes for the process of temporarily securing the sealing fin F and the caulking wire W. Specifically, for starting the caulking step of caulking the caulking wire W, the sealing fin F is inserted into the sealing groove G and the caulking wire W is applied to the sealing groove G, and then the headstock 2 is actuated. As the rotor R is rotated, the holding roller 11 contacts the caulking wire W before the pressing roller 8b contacts the caulking wire W, loosely fitting the caulking wire W into the sealing groove G. Then, the caulking wire W is caulked by being pressed by the pressing roller 8b following the holding roller 11. In this manner, even though the sealing fin F and the caulking wire W have not been temporarily secured manually in advance using a chisel or the like, the caulking wire W is smoothly caulked in the sealing groove G to fix the sealing fin F to the rotor R. The period of time required to fix the sealing fin F can be reduced by the period of time that would otherwise be required to temporarily secure the sealing fin F and the caulking wire W. The second embodiment also offers the same advantages as with the first embodiment.

DESCRIPTION OF REFERENCE CHARACTERS

2: Headstock
2a: Spindle (rotational shaft of the headstock)
5: Z-stage
6: X-stage
7: Tool rest
8: Caulking tool
8a: Shank
8b: Pressing roller
9: Cutting tool
10: Measuring instrument
11: Holding roller
F: Sealing fin
G: Sealing groove
R: Rotor
W: Caulking wire.

What is claimed is:

1. A sealing fin fixing apparatus for fixing a sealing fin in a sealing groove defined in an outer circumference of a rotor of a rotary machine, the sealing fin fixing apparatus comprising:
a headstock for setting the rotor thereon;
a Z-stage movable along a Z-axis extending parallel to a rotational shaft of the headstock;
an X-stage supported on the Z-stage and movable along an X-axis in a direction perpendicular to the Z-axis;
a tool rest supported on the X-stage; and
a caulking tool mounted on the tool rest, wherein
the caulking tool includes a shank mounted on the tool rest and a pressing roller rotatably supported on the shank, the pressing roller having a rotational shaft mounted on the tool rest in a posture parallel to the rotational shaft of the headstock, and
while the pressing roller is being held against a caulking wire inserted, together with the sealing fin, in the sealing groove in the rotor that is set on the headstock, the headstock is actuated to rotate the rotor, thereby caulking the caulking wire to fix the sealing fin to the rotor.

2. The sealing fin fixing apparatus according to claim 1, further comprising:
a holding roller for contacting the caulking wire before the pressing roller contacts the caulking wire.

3. The sealing fin fixing apparatus according to claim 1, further comprising:
a cutting tool for, in place of the caulking tool, being mounted on the tool rest.

4. The sealing fin fixing apparatus according to claim 1, further comprising:
a measuring instrument fixed to either the caulking tool or the tool rest, for measuring an outer diameter of the caulking wire or the sealing fin.

* * * * *